E. C. MERSHON.
GAGE FOR STRAIGHT EDGES.
APPLICATION FILED SEPT. 6, 1910.

1,017,639.

Patented Feb. 13, 1912.

WITNESSES:
J. Ray Abbey.
Christine Braidel

Edward C. Mershon INVENTOR

BY

Geo. B. Willcox ATTORNEY

UNITED STATES PATENT OFFICE.

EDWARD C. MERSHON, OF SAGINAW, MICHIGAN, ASSIGNOR TO WM. B. MERSHON & CO., OF CARROLLTON, MICHIGAN, A CORPORATION OF MICHIGAN.

GAGE FOR STRAIGHT-EDGES.

1,017,639.        Specification of Letters Patent.     Patented Feb. 13, 1912.

Application filed September 6, 1910. Serial No. 580,555.

*To all whom it may concern:*

Be it known that I, EDWARD C. MERSHON, a citizen of the United States, residing at Saginaw, in the county of Saginaw and State of Michigan, have invented certain new and useful Improvements in Gages for Straight-Edges; and I do hereby declare the following to be a full, clear, and exact description of the invention, such as will enable others skilled in the art to which it appertains to make and use the same.

This invention is a gage for straight edges and is especially adapted for use with straight edges such as are commonly employed by band saw dressers and in like arts.

My improvement is particularly adapted for such work as gaging the amount of curve or bow to be given to one edge of a flat piece of metal, as for instance the back edge of a band saw.

It is well known that saw dressers, in fitting band saws, do not leave the back edge of the saw straight, but stretch or bow it slightly so as to make the back edge of the saw slightly longer than the front edge, the object being to bring most of the tension on the front or cutting portion of the band saw when the saw is running, thereby imparting steadiness to the saw.

The amount of "bow" given to the back edge of the saw is very slight and the operation of stretching the back part of the blade is one that requires skill on the part of the saw dresser, especially if he is obliged to gage by his eye the uniformity of curvature given to the back edge of the saw blade. For this purpose a straight edge is usually employed.

My invention comprises a gage adapted to be attached to an ordinary straight edge, the gage having a shoulder adapted to be adjusted so that it can project beyond the line of the straight edge when used for gaging the curvature of saw blades and the like, or be drawn back when the straight edge is to be used in the ordinary way.

My improvement also comprises means by which the adjustment may be made with the utmost accuracy and yet be not likely to be put out of adjustment with ordinary handling.

With these objects in view, my invention consists in the devices illustrated in the accompanying drawings, in which—

Figure 1:
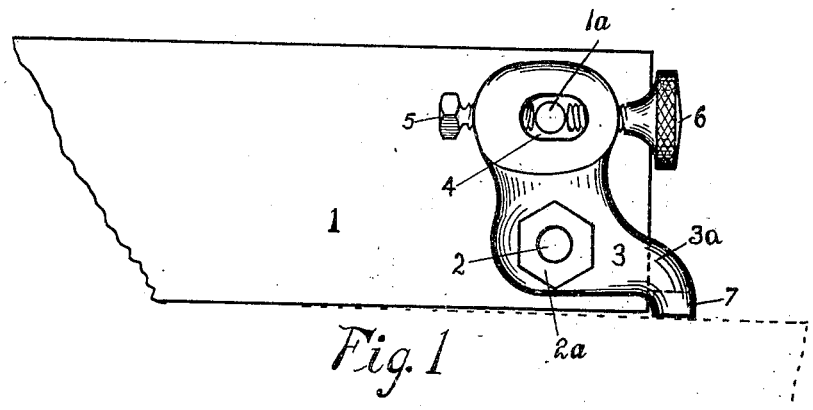
Figure 3:
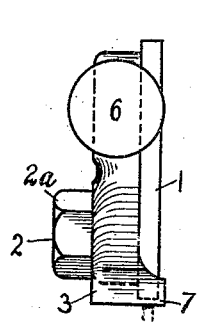
Figure 2:
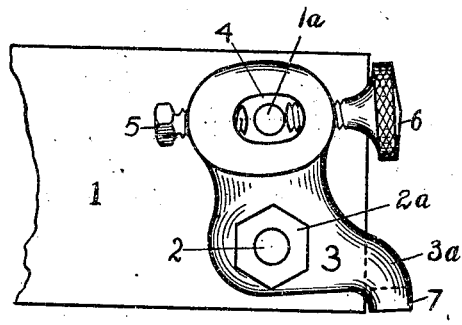
Figure 4:
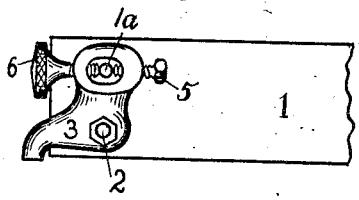

Figure 1 is a side view of one extremity of a straight edge with my improvement attached, showing the adjustable shoulder projecting slightly beyond the line of the straight edge, Fig. 2 is a similar view showing the shoulder drawn back, Fig. 3 is an end view of the part shown in Fig. 2, and Fig. 4 shows a straight edge with the shoulders adjusted for the fitting of band saws.

As is clearly shown in the drawings, the device consists in a straight edge 1 carrying a laterally projecting pin $1^a$ and a laterally projecting pivot 2. On the pivot 2 is mounted a bracket 3, the face of which bears against the face of the straight edge. The bracket is held in place by a nut $2^a$ or by any other suitable device. The bracket 3 has a limited turning movement about the pivot 2. The amount of turning movement is regulated by means of a set bolt 5 threaded into the upper end of the bracket and an opposing clamping screw 6, the ends of the bolt and clamping screw being adapted to bring up against the opposite sides of the fixed pin $1^a$, the upper end of the bracket having an elongated opening 4 to receive the pin. The lower end of the bracket 3 has a horizontally projecting arm $3^a$, the outer end of which is provided with a shoulder 7. The shoulder lies beyond the end of the straight edge 1 and projects laterally so that the bottom face of the shoulder projects slightly past the plane of the straight edge, as indicated in Fig. 3.

When the straight edge is applied to the rear edge of a band saw blade, as indicated by dotted lines in Figs. 1 and 3, the middle part of the straight edge will touch the saw and the ends of the straight edge will be supported by the shoulders 7 resting against the edge of the saw when the latter has been given the proper degree of curvature. The amount of curvature depends upon the amount the face of the shoulder 7 projects beyond the working line of the straight edge, and the distance it projects is regulated by the adjustment of the set bolt 5. When the set bolt is in the desired position, clamping screw 6 is tightened so as to clamp pin $1^a$ against the end of the set bolt 5. By this means any desired amount of projection may be given to the shoulder 7, and so long as the adjustment of the set bolt 5 remains undisturbed, the clamping screw 6 may be released and tightened as often as desired, always returning the shoulder 7 to its proper position. By this means the straight edge may be used in the ordinary way, the shoulder 7 being retracted, and whenever desired the standard amount of curvature for stretching the saw may be gaged by merely tightening the clamping screw 6.

Having described my invention, what I claim and desire to secure by Letters Patent, is:—

1. The combination with a straight edge, of a pivot and a laterally projecting pin carried by said straight edge, a bracket mounted on said pivot and provided with an opening to receive the pin, a set bolt and an opposing clamping screw carried by the bracket and located on opposite sides of said opening and adapted to engage said pin between them, and an arm carried by the bracket, said arm formed with a transversely projecting shoulder.

2. The combination with a straight edge, of a pivot, an L-shaped arm carried by said pivot, one branch of said arm formed with a transversely projecting shoulder, a projecting pin on said straight edge and means carried by the remaining branch of said arm and engaging said projecting pin, said means adapted to adjust the position of said arm with relation to the straight edge.

In testimony whereof, I affix my signature in presence of two witnesses.

EDWARD C. MERSHON.

Witnesses:
 JOHN RICHTER,
 WM. P POWELL.